United States Patent
Kramlich

(10) Patent No.: US 7,741,938 B2
(45) Date of Patent: Jun. 22, 2010

(54) ROTARY ACTUATOR WITH PROGRAMMABLE TACTILE FEEDBACK

(75) Inventor: Andreas Kramlich, Schweinfurt (DE)

(73) Assignee: PREH GmbH (DE)

( * ) Notice: Subject to any disclaimer, the term of this patent is extended or adjusted under 35 U.S.C. 154(b) by 0 days.

(21) Appl. No.: 11/949,747

(22) Filed: Dec. 3, 2007

(65) Prior Publication Data

US 2008/0229871 A1  Sep. 25, 2008

Related U.S. Application Data

(63) Continuation of application No. PCT/EP2006/005321, filed on Jun. 2, 2006.

(30) Foreign Application Priority Data

Jun. 2, 2005 (DE) .......... 10 2005 025 779
Jul. 14, 2005 (DE) .......... 10 2005 033 512
Sep. 12, 2005 (DE) .......... 10 2005 043 587

(51) Int. Cl.
H01H 3/00 (2006.01)
H01H 9/00 (2006.01)
H01H 51/00 (2006.01)
H01H 9/28 (2006.01)
H03K 17/94 (2006.01)
H03M 11/00 (2006.01)
G05G 5/06 (2006.01)

(52) U.S. Cl. .......... 335/77; 341/35; 200/43.11; 200/43.16; 335/113; 335/114; 335/167; 74/527

(58) Field of Classification Search .......... 341/35; 200/43.11, 43.16, 318, 320; 318/626, 628; 335/77, 108–111, 113–114, 164, 167; 74/527
See application file for complete search history.

(56) References Cited

U.S. PATENT DOCUMENTS

| 2,627,945 A * | 2/1953 | Hooker .......... 188/69 |
| 2,909,940 A * | 10/1959 | Dawkins .......... 74/527 |
| 3,021,512 A * | 2/1962 | Welsh et al. .......... 360/267 |
| 4,318,095 A | 3/1982 | Fukuoka |
| 4,378,474 A | 3/1983 | Olson |
| 4,481,492 A * | 11/1984 | Borne et al. .......... 335/164 |
| 5,014,030 A * | 5/1991 | Aston .......... 335/228 |
| 5,343,179 A * | 8/1994 | Pipich et al. .......... 335/167 |
| 5,499,007 A * | 3/1996 | Flohr .......... 335/201 |
| 5,956,016 A | 9/1999 | Kuenzner et al. |
| 6,404,354 B1 | 6/2002 | Decker et al. |

FOREIGN PATENT DOCUMENTS

| DE | 1 029 908 | 5/1958 |
| DE | 101 53 002 A1 | 6/2003 |
| JP | 54114692 A * | 9/1979 |

* cited by examiner

*Primary Examiner*—Elvin G Enad
*Assistant Examiner*—Mohamad A Musleh
(74) *Attorney, Agent, or Firm*—Cantor Colburn LLP

(57) ABSTRACT

A control element is provided having programmable haptics, in particular a programmable central catch, for a motor vehicle, having a control knob which can be accommodated such that it can rotate, the control knob being connected in a force-fitting or interlocking manner to a toothed ring or having an integral design, and it being possible for the toothed ring (to be rotated by means of the control knob, and at least one latching element which can move towards the toothed ring and/or away from the toothed ring by means of an electromagnet.

14 Claims, 3 Drawing Sheets

ROTARY ACTUATOR WITH PROGRAMMABLE TACTILE FEEDBACK

This nonprovisional application is a continuation of International Application No. PCT/EP2006/005321, which was filed on Jun. 2, 2006, and which claims priority to German Patent Application Nos. DE 102005025779, 102005033512, 102005043587, which were filed in Germany on Jun. 2, 2005, Jul. 14, 2005, and Sep. 12, 2005, respectively, and which are all herein incorporated by reference.

BACKGROUND OF THE INVENTION

1. Field of the Invention

The present invention relates to an operating element with programmable tactile feedback for a motor vehicle.

2. Description of the Background Art

Operating elements in the form of a rotary actuator or rotary knob are known in many different forms in the prior art. The functionality, and thus the tactile feedback to the user, is accomplished by means of discrete detent positions, for example. In addition, operating elements are known which have a programmable feel in order to be able to flexibly configure the tactile feedback during operation, for example as a function of the quantity to be adjusted.

The term center detent describes a special detent, which, for example, requires an increased force to overcome it in the adjustment range of an operating element, and which thus is perceptible to the user by means of tactile feedback. In audio amplifiers, for example, this is the center position of the panoramic potentiometer that controls the volume balance between the left and right channels. However, the center detent need not necessarily be located in the center of the adjustment range, but rather any desired exposed position, such as a default value for example, can be implemented as detent. Multiple such detents may also be provided in an adjustment range.

SUMMARY OF THE INVENTION

It is an object of the present invention to provide an operating element with programmable tactile feedback that is economical, simple in design, compact, and easy to integrate.

An inventive operating element with programmable tactile feedback, in particular a programmable center detent, has a rotatably supported control knob, wherein the control knob is connected to a toothed ring in a frictional or interlocking manner, or is designed as a single piece therewith, and the toothed ring is rotatable by means of the control knob, and has at least one detent element that is movable toward and/or away from the toothed ring by means of an electromagnet.

When an electric current is impressed on the electromagnet, this current produces a magnetic force that causes the detent element to move. The toothed ring is an annular component in whose inner and/or outer circumference a detent profile is provided in the form of recesses and/or raised areas. The result is a contour which the detent element can engage with and which the detent element can traverse. In this connection, the detents in the toothed ring can in principle have any desired arrangement, but it is advantageous for the detents to be equidistant in their arrangement. The detent element is, for example, a tappet or another movable component. The detent element can also be designed as a projection of an element, such as of a lever or leaf spring, for example.

In an embodiment of the invention, the toothed ring is designed as a single piece with the handle, for example the control knob, of the operating element. In another embodiment, the toothed ring is connected to the handle in a frictional or interlocking manner. When the detent element is engaged with the toothed ring, the user perceives this as a noticeable detent when rotating the handle or toothed ring.

In another embodiment, the operating element additionally has at least one fine detent spring. This fine detent spring stands in constant contact with the toothed ring. By this means, a first, basically mechanical detent is provided, which is always active and depends on the shape of the recesses in the toothed ring, the form of the spring and its spring characteristic curve. When the tappet is not engaged with the toothed ring, the tactile feedback of the operating element is produced by the fine detent spring alone. Thus, this detent is referred to below as the fine detent. The freely programmable advance of the detent element affords the possibility of superimposing an additional detent over the first detent, so that the force necessary to overcome the combined detent can be adjusted as desired. This additional detent is referred to below as the switchable detent.

In another embodiment, the operating element has a detent spring and a permanent magnet, wherein the detent element is rigidly connected to the detent spring, and the spring force of the detent spring opposes the magnetic force of the permanent magnet. The detent spring is arranged such that it presses the detent element against the toothed ring, while the permanent magnet is oriented such that its magnetic force pulls the detent element away from the tooth ring. The permanent magnet and electromagnet are oriented with respect to one another such that, depending on how the current is applied, the electromagnet increases or reduces the magnetic force of the permanent magnet on the detent element.

When the switchable detent is activated, the detent element is brought into engagement with the toothed ring by the spring force. When the handle of the operating element, and thus the toothed ring, is rotated out of the detent, the detent element is forced away from the toothed ring, in opposition to the spring force, by the shape of the edge of the recess and/or raised area in the toothed ring, and rotation is permitted. Depending on the programmed tactile feedback, the detent element engages with the next recess in the toothed ring, or is kept out of engagement by the permanent magnet.

When the switchable detent is inactive, the detent element is so close to the permanent magnet that the magnetic force exceeds the spring force opposing it, and the detent element is not engaged with the toothed ring. In the extreme case, the detent element contacts the permanent magnet or the electromagnet.

In another embodiment, the operating element has a lever for transmitting the magnetic force of the electromagnet to the detent element. When current is applied to the electromagnet, it attracts the lever, which thus brings the detent element into engagement with the toothed ring. Due to the shape of the detent element and the shape of the toothed ring's recess, a force must be applied during rotation of the operating element out of the detent that releases the detent element from engagement with the toothed ring. In addition, this force must exceed the electromagnet's force of attraction transmitted by the lever. If the lever is in contact with the magnet, this force of attraction corresponds to the pull-off force of the magnet.

In another embodiment, the operating element has at least one second magnet and at least one second detent element. In this way, multiple tactile feedback patterns can be produced which can be activated in alternation or simultaneously.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
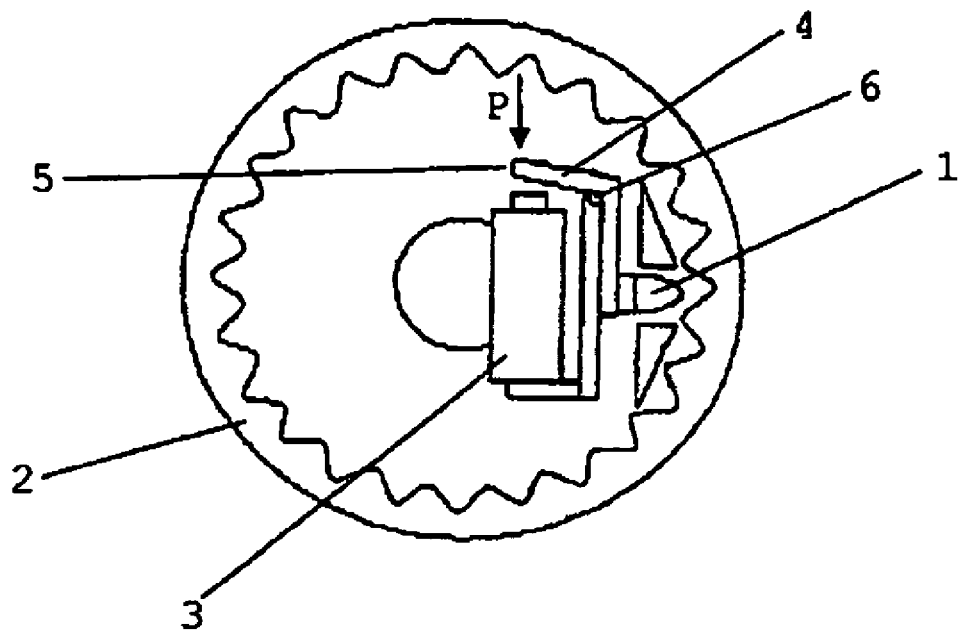
FIG. 1a illustrates an operating element with lever mechanism when no current is applied to the magnet.

FIG. 1a shows a cross-section through an inventive operating element with a detent element in the form of a tappet 1, which can engage with recesses or teeth of a toothed ring 2. The toothed ring 2 rotates about an axis that is perpendicular to the plane of the drawing, and is connected to the control knob (not shown) of the operating element in a frictional or interlocking manner, for example. Alternatively, the toothed ring 2 is part of the control knob. The force needed to advance the tappet 1 is produced by an electromagnet 3 and is transmitted by an essentially L-shaped lever 4. In the state shown in FIG. 1a, the electromagnet 3 is not supplied with current, and the tappet 1 is not in engagement with the toothed ring 2. When current is applied to the electromagnet 3, the resultant magnetic force pulls an end 5 of the lever 4 in the direction P toward the electromagnet 3. The lever 4 rotates about a pivot point 6, causing the tappet 1 to be pressed into a recess of the toothed ring 2. This state is shown in FIG. 1b.

Figure 1B:
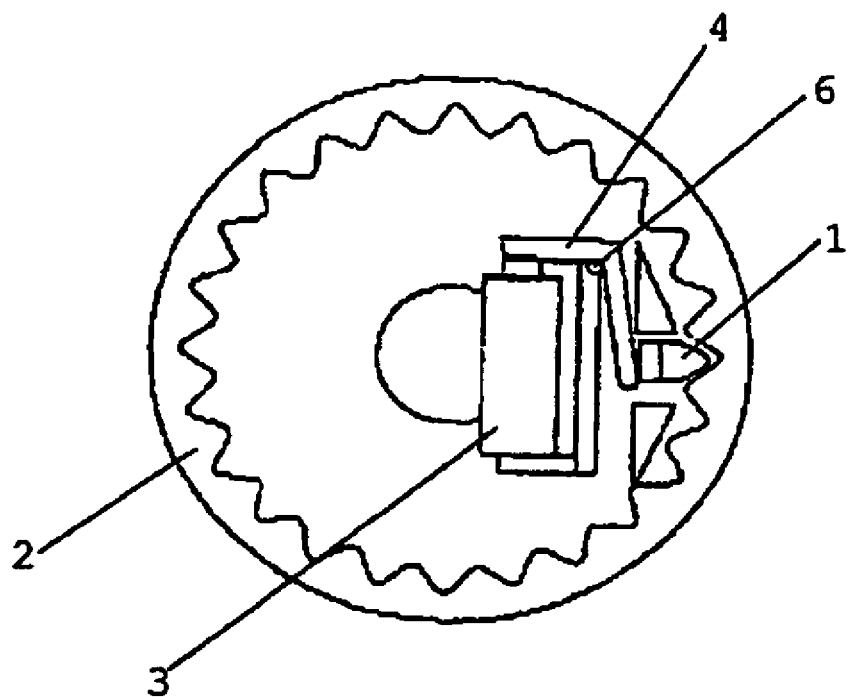
FIG. 1b illustrates an operating element with lever mechanism when current is applied to the magnet.

While the toothed ring in FIG. 1a can rotate freely, the rotation in FIG. 1b is hindered by the tappet 1. The tappet 1 and the recesses in the toothed ring 2 are shaped such that rotation of the toothed ring 2 produces a force that opposes the force transmitted by the lever 4 to the tappet 1. If this force produced by rotation exceeds the force transmitted by the lever 4, then the tappet 1 moves out of the recess and the toothed ring 2 can be rotated further. Preferably the rotation of the toothed ring 2 is detected by an angular position sensor (not shown) of any desired type. Depending on the programming of the operating element, the current supply to the electromagnet 3 is interrupted when rotation of the toothed ring 2 is detected, with the result that the tappet 1 is not pressed into an adjacent recess of the toothed ring 2, and thus no further perceptible detent is produced, or current continues to be supplied to the electromagnet 3, with the result that the tappet 1 engages with the nearest recess in the toothed ring 2.

The tactile feedback of the operating element is freely programmable through storage of a characteristic curve for the angular position of the toothed ring 2 at which current should be applied to the electromagnet 3. The force required to overcome the detent depends firstly on the geometric design of the tappet 1 and recesses and/or raised areas in the toothed ring 2, and secondly on the magnitude of the current impressed on the magnet 3. Consequently, the force necessary to overcome a particular detent can be individually programmed by varying the current through the electromagnet 3. This force can be large enough that the control knob cannot be rotated out of the detent, thus constituting an end stop.

Figure 2:
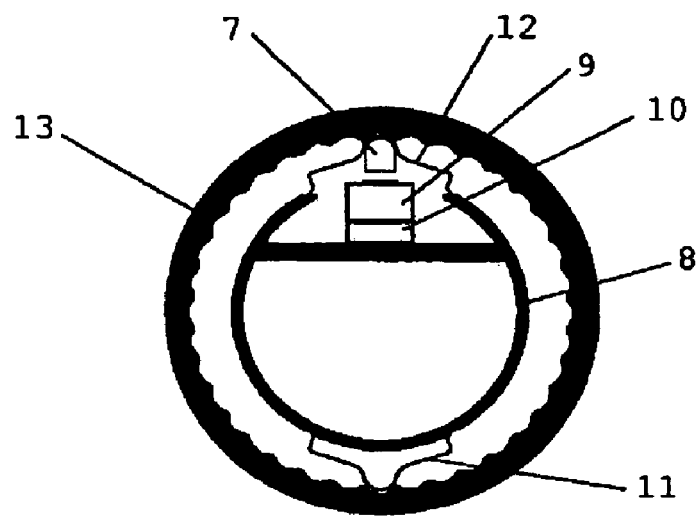
FIG. 2 illustrates an operating element with spring mechanism.

FIG. 2 shows a section of an inventive operating element with a spring-loaded tappet 7. A stationary inner part 8 has an electromagnet 9, a permanent magnet 10, a fine detent spring 11 and a detent spring 12. The movable tappet 7 is rigidly attached to the detent spring 12. In this context, the detent spring 12 is arranged such that its spring force presses the tappet 7 radially toward the toothed ring 13. The permanent magnet 10 is arranged such that the magnetic force it generates acts against the force of the detent spring 12 and pulls the tappet 7 away from the toothed ring 13. The fine detent spring 11 is arranged such that it continuously contacts the toothed ring 13 and stands in engagement with the recesses of the toothed ring 13, which has a uniform diameter. Thus, in order to rotate the toothed ring 13, it is always necessary to overcome the detent created by the fine detent spring 11. If the switchable detent is activated and the tappet 7 is likewise in engagement with the toothed ring 13, then a greater torque must be applied in order to rotate the control knob out of the detent. In this way, this detent is perceptibly emphasized relative to other detents. It should be noted that the fine detent spring 11 is an optional element. Without the fine detent spring 11, the control knob is freely rotatable except for the programmed detents.

Figure 3A:
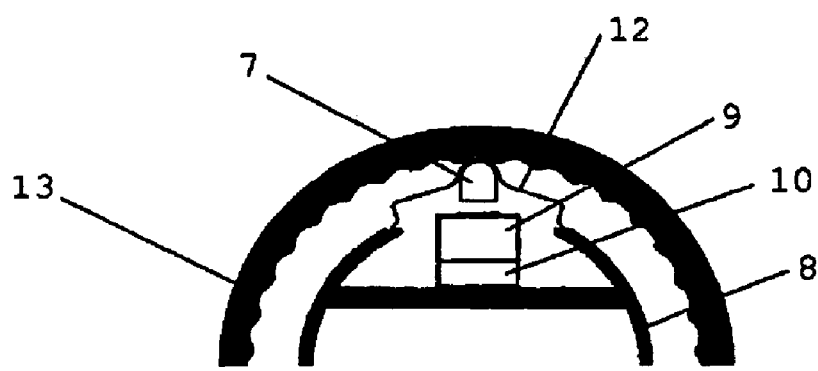
FIG. 3a illustrates an engaged spring-loaded tappet.

FIG. 3a shows the tappet 7 in an end position where it engages a recess of the toothed ring 13 and where the rotation of the toothed ring 13 is thus opposed by a force that the user perceives as an additional superimposed detent. In this case, the force of the spring 12 exceeds the opposing force of the permanent magnet 10, and the tappet 7 rests against the toothed ring 13.

Figure 3B:
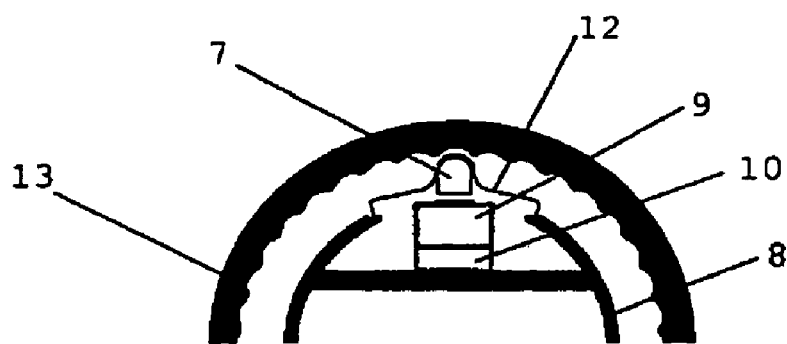
FIG. 3b illustrates a partially engaged spring-loaded tappet.

In FIG. 3b, the tappet 7 is in partial engagement with a recess of the toothed ring 13. In this case, a current is impressed on the electromagnet 9 that reinforces the force of magnetic attraction of the permanent magnet 10 on the tappet 7. The spring force and the magnetic force are in equilibrium, with the result that the tappet 7 is in partial engagement with the toothed ring 13. Consequently, as compared to the state in FIG. 3a, only a relatively small force is necessary in order to overcome the detent and rotate the toothed ring 13. However, it is also possible to apply current to the electromagnet 9 in such a manner that it produces a force that supports the force of the spring 12 and thus presses the tappet 7 harder against the toothed ring 13, in this way, overcoming the detent requires a greater torque than when the electromagnet 9 is switched off. In the extreme case, the tappet 7 is pressed against the toothed ring 13 so strongly that the user cannot turn the control knob, thus simulating a stop.

Figure 3C:
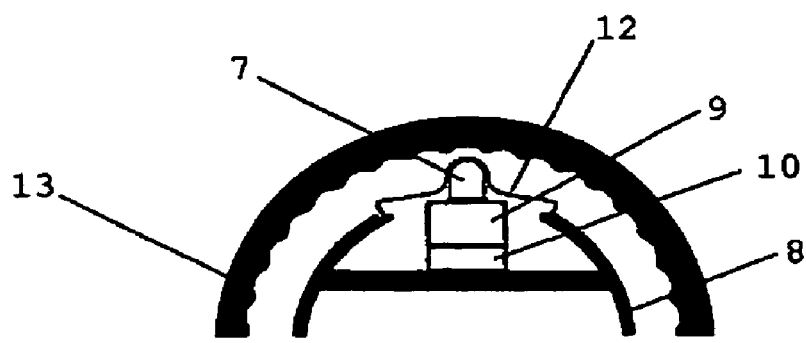
FIG. 3c illustrates a disengaged spring-loaded tappet.

FIG. 3c shows a tappet 7 in its second end position, where it rests against the electromagnet 9. Here, the force of the permanent magnet 10 exceeds the force of the spring 12. The tappet thus is not engaged with the toothed ring 13 and thus does not produce an additional detent. Only the fine detent from the fine detent spring 11 is perceptible to the user.

In order to move the tappet 7 from the position shown in FIG. 3c to the position shown in FIG. 3a, current is applied to the electromagnet 9, producing a magnetic field that is superimposed on the magnetic field of the permanent magnet 10 in such a way that the spring force exceeds the force of the resulting magnetic field on the tappet 7, so that the spring 12 thus presses the tappet 7 against the toothed ring 13.

The movement of the tappet 7 from the position shown in FIG. 3a into the position shown in FIG. 3c is preferably accomplished by the means that the tappet 7 is pushed toward the permanent magnet by the shape of the recesses in the toothed ring 13 as the toothed ring 13 rotates. Starting from a certain position the force of the permanent magnet 10 exceeds the spring force, with the result that the permanent magnet 10 pulls the tappet 7 toward itself.

Moreover, the tappet 7 can be brought out of engagement by applying current to the electromagnet 9 in such a manner that its magnetic field reinforces the magnetic field of the permanent magnet 10, and the resulting magnetic force exceeds the spring force. By this means, the tappet is moved to the position shown in FIG. 3c. Once the tappet 7 has reached this end position, the electromagnet 9 can be switched off, since the magnetic force of the permanent magnet 10 is sufficient to hold the tappet 7 in place. This option is especially advantageous when different quantities can be adjusted using the operating element. One example of this is an operating element for a car radio, with which both the volume and the left-right balance are set. If the balance has been brought to a center position with an additional programmed detent and the function has then been switched to volume control, the rotation of the operating element from its current position should not be opposed by any additional detent.

In the aforementioned second example embodiment, the electromagnet 9 is required in order to move the tappet 7 from one end position to the other. Application of current to the electromagnet 9 is required only for this transition phase. Application of current beyond this transition phase achieves a variable, programmable force that must be applied in order to rotate the toothed ring 13 and thus the control knob.

Figure 4:
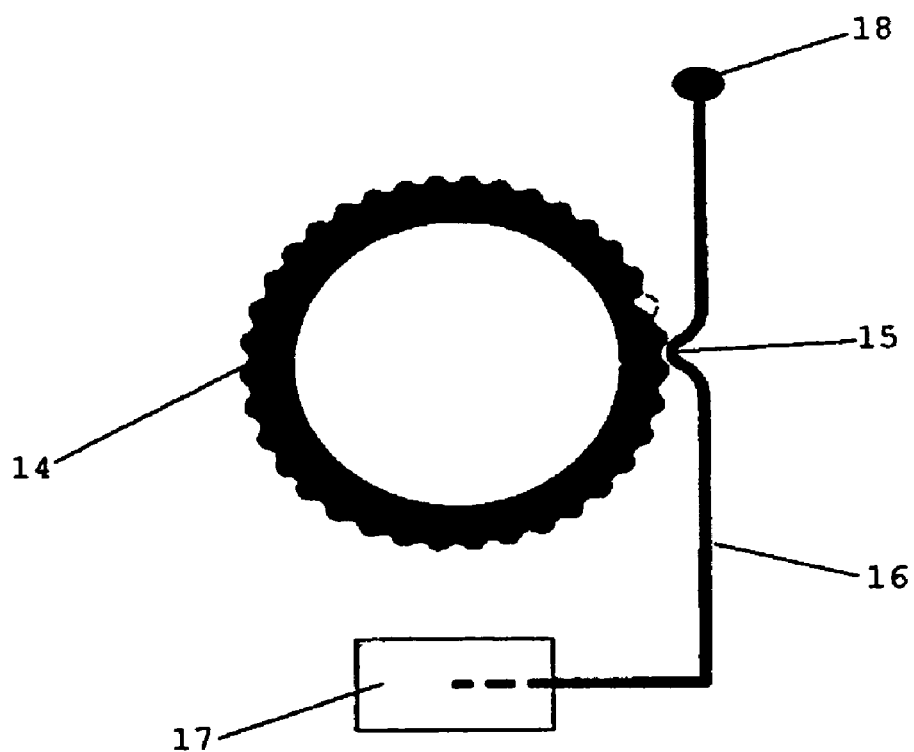
FIG. 4 illustrates an operating element with a detent profile on the outer circumference of the detent disk.

FIG. 4 shows a sectional view of a third example embodiment of an operating element, in which the detent profile is located on the outer circumference of the toothed ring 14. One end of a lever 16 is fixed at a point 18, and the other, angled end projects into an electromagnet 17. When current is applied to the electromagnet 17, the lever 16 is pivoted about the fixed point 18 until the detent element formed by a projection 15 of the lever 16 engages in a recess of the toothed ring 14. The force required to rotate the toothed ring 14 depends on the magnetic force of the electromagnet and the shape of the lever 16. In one variation of the embodiment, a leaf spring is used in place of a rigid lever 16.

Naturally, the fine detent spring 11 from the second example embodiment can also be used in an operating element according to the first or third example embodiment in order to produce a first, continuous mechanical detent. Furthermore, the fine detent spring 11 can be omitted in the second example embodiment so that the toothed ring 13 and the control knob can be rotated freely outside the programmable detents.

In one example embodiment of the invention, the toothed ring 2, 13, 14 has more than one detent profile. In a first variant of this embodiment, the toothed ring 2, 13, 14 has multiple detent profiles on the same circumference, thus on the inner or outer circumference. In a second variant of this embodiment, at least one detent profile each is located on the inner and outer circumference of the toothed ring 2, 3, 14. In principle, the toothed ring 2, 3, 14 can be composed of multiple separate disks provided with recesses and/or raised areas. As a result of different detent profiles, it is possible for the fine detent spring 11 and the detent element 1, 7, 15 to work together with different detent profiles, for example. In this way, the detents produced with the aid of the detent element 1, 7, 15 can be placed independently of the detents produced by the fine detent spring 11.

Moreover, it is within the scope of this invention to arrange multiple magnets and tappets in the operating element. Each tappet can be programmed with its own detent characteristics. The characteristics of the individual tappets can be activated in alternation or simultaneously. If multiple detent profiles are present on the toothed ring, each tappet can engage in any desired detent profile.

By applying a sufficiently large current to the electromagnet, it is possible to produce a force on the detent element 1, 7, 15 that is large enough to result in an end stop instead of a detent that can be overcome.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An operating element having programmable tactile feedback, in particular a programmable center detent, for a motor vehicle, the operating element comprising:
   a rotatably supported control knob, the control knob being connected to a toothed ring in a frictional or interlocking manner or being a single piece therewith, the toothed ring being rotatable by the control knob; and
   at least one detent element that is movable toward and/or away from the toothed ring by an electromagnet, the detent element abutting the electromagnet when moved away from the toothed ring and the detent element and the electromagnet being disposed within the tooothed ring.

2. The operating element according to claim 1, wherein the detents have an equidistant arrangement in the toothed ring.

3. The operating element according to claim 1, further comprising at least one fine detent spring.

4. The operating element according to claim 1, further comprising:
   a detent spring; and
   a permanent magnet,
   wherein the detent element is rigidly connected to the detent spring, and
   wherein a spring force of the detent spring opposes a magnetic force of the permanent magnet.

5. The operating element according to claim 1, further comprising a lever for transmitting a magnetic force of the electromagnet to the detent element.

6. The operating element according to claim 1, further comprising at least one second magnet and at least one second detent element.

7. The operating element according to one of claims 1 through 6, wherein the toothed ring has teeth on an inner circumference thereof.

8. An operating element having programmable tactile feedback, the operating element comprising:
   a rotatably supported control knob,
   a toothed ring rotatable with the control knob;
   at least one detent element; and
   an electromagnet operably connected to the at least one detent element for moving the at least one detent element relative to the toothed ring, the detent element abutting the electromagnet when moved away from the toothed ring,
   wherein the detent element and the electromagnet are disposed within the tooothed ring and the electromagnet is configured to move the detent element toward the toothed ring with a first level of force when the toothed ring is in a first range of angular positions relative to the detent element and to move the detent element toward the toothed ring with a second level of force greater than said first level of force when the toothed ring is in a second range of angular positions relative to the detent element to define a center detent in the second range of angular positions.

9. The operating element according to claim 8, wherein the teeth have an equidistant arrangement in the toothed ring.

10. The operating element according to claim 8, further comprising at least one fine detent spring.

11. The operating element according to claim 8, further comprising:

a detent spring; and
a permanent magnet,
wherein the at least one detent element is rigidly connected to the detent spring, and
wherein a spring force of the detent spring opposes a magnetic force of the permanent magnet.

12. The operating element according to claim 8, further comprising a lever for transmitting a magnetic force of the electromagnet to the at least one detent element.

13. The operating element according to claim 8, further comprising at least one second magnet and at least one second detent element.

14. The operating element according to claim 8, wherein the toothed ring has teeth on an inner circumference thereof.

* * * * *